INVENTOR
GARLAND W. ARCHER
BY
Norman J. O'Malley
ATTORNEY

INVENTOR
GARLAND W. ARCHER
BY
Norman J. O'Malley
ATTORNEY

United States Patent Office 2,947,811
Patented Aug. 2, 1960

2,947,811

TELEVISION APPARATUS

Garland W. Archer, Snyder, N.Y., assignor, by mesne assignments, to Sylvania Electric Products Inc., Wilmington, Del., a corporation of Delaware Filed Mar. 12, 1956, Ser. No. 571,043

2 Claims. (Cl. 178—7.5)

This invention relates to electrical apparatus and more particularly to television receiving apparatus which employs a large number of circuits, many of which are provided with manual control elements used for easy adjustment of electrical circuit characteristics.

In television receivers designed for the reproduction of monochrome pictures, it has been found necessary to provide the receiver with an unusually large number of manual control elements so that circuit characteristics can be properly selected without removing the television chassis on each occasion where adjustments are necessary. These control elements generally are included in one of three groups, the categories of which are arranged in accordance with such requirements as probable frequency of adjustment, need for electrical test equipment during adjustment, accessibility for the serviceman, and accessibility for the customer.

It has been found advisable in many instances to mount some of the control elements so that they are inaccessible to the customer, since many of these adjustments are critical and interrelated in such a manner that a technical knowledge is needed to make the proper adjustments.

The first group of controls generally include variable resistances, capacitances and inductances used in the tuned circuits employed in the various receiver sections. These adjustments are initially made by the manufacturer and are usually only accessible to the serviceman after removal of the receiver chassis. The second group of control elements, which are usually mounted in the lower back area of the chassis for easy access to the serviceman include primarily those controls whose adjustments are readily visually observable on the picture tube during receiver operation such as the vertical and horizontal hold, height, vertical linearity, automatic gain, and width controls. The third group of adjustable elements, which are located on the tuning panel of the cabinet, are conventionally referred to as the customer controls. This latter group includes the adjustments necessary for normal receiver operation such as on-off switch, volume, brightness, contrast, and tuning mechanisms.

With the advent of commercial color television receivers, the additional controls needed due to the increased complexity of the circuits has aggravated the problem of providing a proper positioning for these controls, with due consideration being given to the determining factors mentioned above.

It is conventional practice for a serviceman, when adjusting and aligning a television receiver, to have the receiver operating so that he may visually observe on the picture tube the results of his adjustments. Since the control elements which the serviceman usually manipulates are in the back of the cabinet and opposite the viewing screen, he generally positions himself behind the set for easy access to the adjustable elements, and visually observes the image of the picture reflected to him by means of a mirror. This procedure is cumbersome, and becomes increasingly aggravated with each increase in the number of control elements employed. In addition, during the period of adjustment, the back panel of the cabinet is removed, thereby exposing the serviceman to high voltages ranging up to 25,000 volts while the apparatus is in operation.

In order to provide a more convenient access to television receiver service controls, while still endeavoring to isolate these adjustable elements from the customer, manufacturers of color television receivers have mounted the control elements above the chassis and provided a removable top cabinet cover. However, a majority of the controls so mounted are still not accessible to a serviceman so as to allow him to visually observe the screen while he is making his adjustments. In addition, the construction of a cabinet of this type is costly, and the necessity of removing the top of the cabinet every time an adjustment must be made is cumbersome. It has also been proposed to mount these service controls on the front cabinet panel, and cover them with a closure member to discourage customer manipulation. However, cabinet size is extremely important in those instances where compactness is desired, such as in portable and table model receivers. In these types of receivers the front cabinet panel is usually not much larger than the viewing screen of the picture tube, and consequently no space is available for mounting a service control unit.

Accordingly, it is an object of this invention to reduce the aforementioned difficulties and to provide an improved mounting for service controls which is isolated from the customer while being readily accessible to the serviceman so that he may make most of the desired adjustments while visually observing the picture produced upon the viewing screen of the operating receiver.

A further object is to provide a service control chassis mounted in a limited space cabinet so that it is readily accessible to servicemen while being isolated from the customer.

The foregoing objects are achieved in one aspect of the invention by the provision of an auxiliary chassis having the service controls affixed thereto which is mounted internally of the cabinet during normal operation of the receiver, and which may be removed from the cabinet and placed adjacent the viewing screen during control adjustment manipulation by a serviceman.

For a better understanding of the invention, reference is made to the following description taken in conjunction with the accompanying drawings in which.

Figures 1, 2:
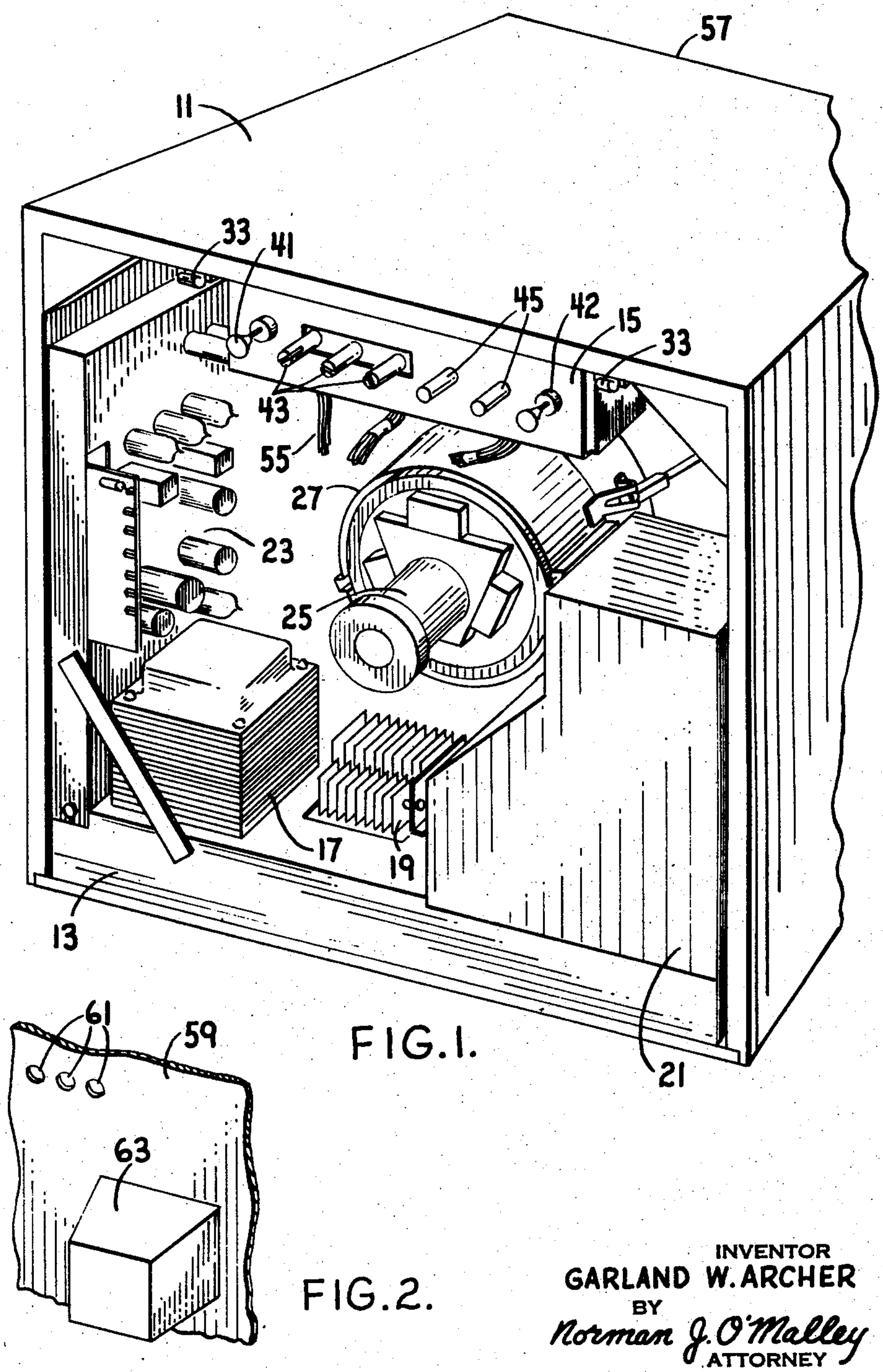
Fig. 1 is a partial perspective view of a color television apparatus having the back cover removed.
Fig. 2 shows a portion of a back cover of the type which may be employed with the receiver shown in Fig. 1.

Referring to Fig. 1, a television cabinet 11 is shown with a primary electrical chassis 13 and an auxiliary chassis 15. The primary chassis is illustrated as having both horizontal and vertical chassis portions. Mounted on the horizontal portion are elements of the low voltage power supply designated as transformer 17 and rectifiers 19. Unit 21 indicates the cover member for the high voltage supply. Normally, the horizontal and vertical scan circuits, other than the deflection coils, are also mounted on the horizontal chassis portion. The vertical chassis portion conventionally supports the video and audio strips similar to the one designated as strip 23. A picture tube 25 is normally mounted upon and positioned above the horizontal chassis portion so that the viewing screen is adjacent the front panel of cabinet 11, while the neck of the picture tube extends to a position adjacent the back panel of the cabinet. Deflection and convergence units 27 are mounted on the neck of tube 25.

The foregoing electrical circuit components have been recited generally to illustrate one type of electrical apparatus chassis layout which is adapted to be used with the invention.

Figure 3:
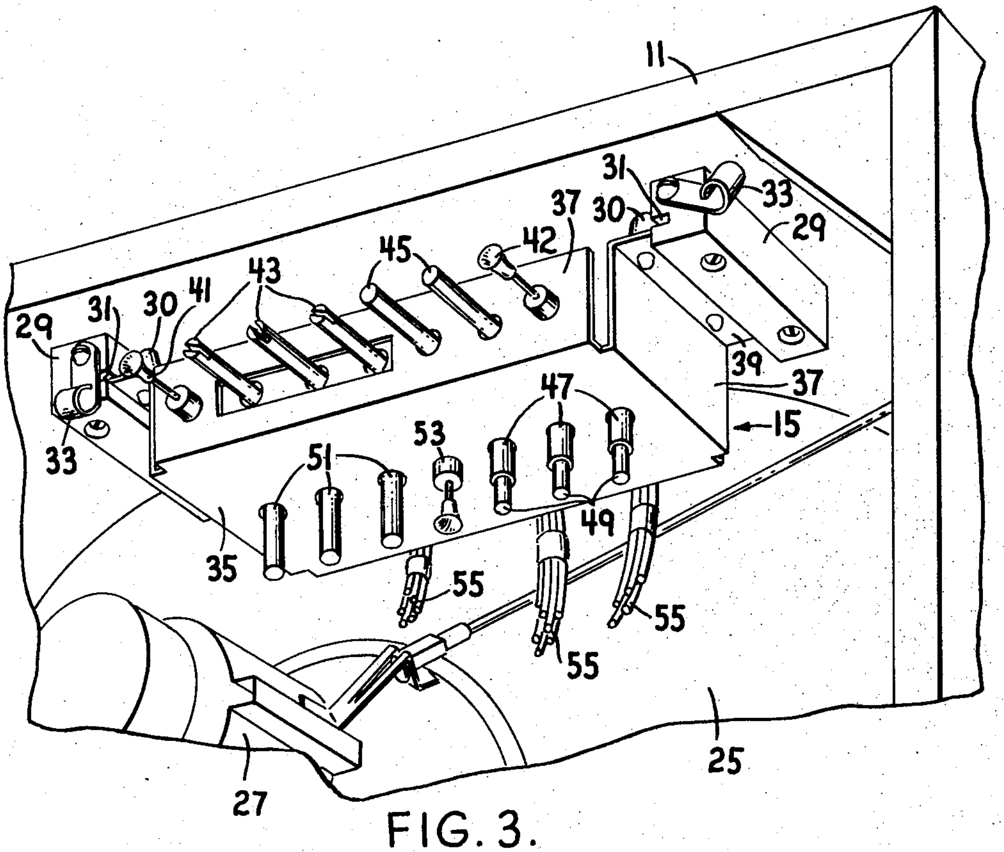
Fig. 3 is a partial perspective view showing in detail an auxiliary chassis with adjustable service controls mounted thereon.
Figure 4:
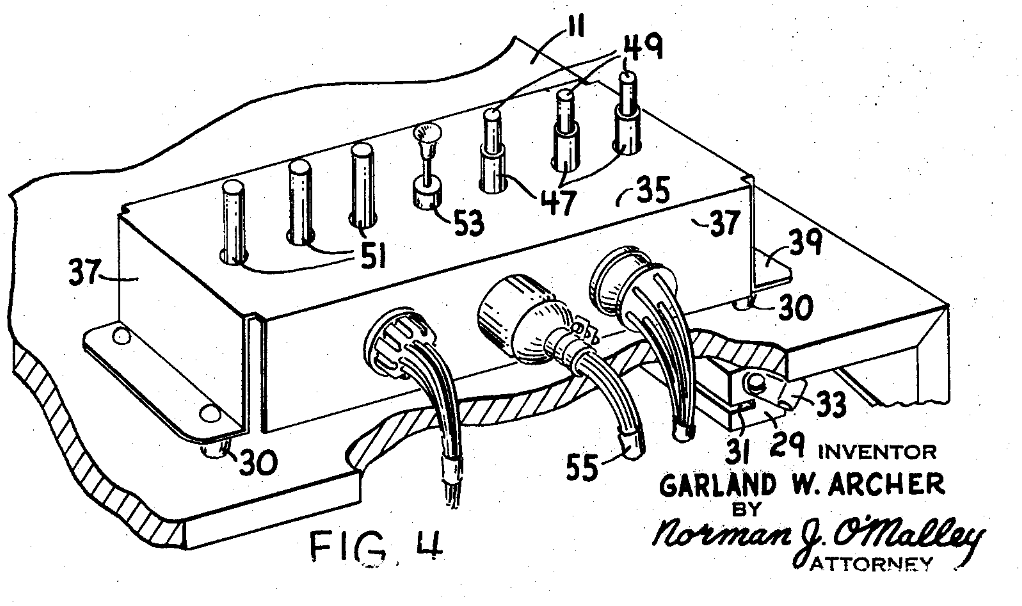
Fig. 4 is a partial perspective view showing an auxiliary chassis resting upon the upper surface of a television receiver cabinet.

Auxiliary chassis 15 is mounted on the internal surface of the top of cabinet 11 as seen in Figs. 3 and 4. The cabinet has two support members 29, preferably disposed in parallel relationship and attached to the lower surface of the top cabinet panel. Each support member 29 has longitudinally extending grooves 31 having a length preferably as long as the width of auxiliary chassis 15. Rotatably mounted on the ends of members 29 are locking devices 33, which serve to close the ends of their respective grooves 31 when they are positioned substantially in a vertical direction.

Auxiliary chassis 15 is formed with a central section 35 and side sections 37. Extending laterally from two of the side sections are end sections or terminal portions 39 which are formed to slidably engage grooves 31 and be partially confined therein during normal operation of the television apparatus. Locking devices 33 prevent end sections 39 from becoming slidably detached from support members 29 when they are properly positioned. A pair of feet 30 are mounted on each end section to support the auxiliary chassis when it is removed from members 29.

Auxiliary chassis 15 is illustrated in the drawings as a support for the service controls employed in color television apparatus. Side section 37 is shown supporting the elements for such electrical circuit variable impedances as the red and blue horizontal tilt controls 41 and 42, red, green and blue screen controls 43, and the red and blue background controls 45. Mounted upon central section 35 are the red, green and blue vertical tilt controls 47, the red, green and blue vertical amplitude controls 49, the red, green and blue horizontal amplitude controls 51, and the green horizontal tilt control 53. Attached to auxiliary chassis 15 are the lead wires 55, which serve to supply the voltages for the various controls and to electrically connect these controls to picture tube 25 and primary chassis 13. The lead wires 55 have a length sufficient to allow auxiliary chassis 15 to be removed from the cabinet and placed in a position on top of cabinet 11 sufficiently close to the top viewing position edge 57 of the cabinet to allow manipulation of the controls from that position. A few of the adjustments which may be made by a serviceman, such as the positioning of the yokes and the blue purity magnet employed in a trigun picture tube receiver, usually must be made from the back of the cabinet since the adjustable elements are physically mounted on the picture tube neck.

Referring to Fig. 2, there is shown a back panel 59 for a television cabinet having a form which is adapted to be employed with cabinet 11. Several apertures 61 are provided in the back panel for access to such controls as the red, green, and blue screen controls 43, since it has been found advisable to make such controls as these accessible without removal of back panel 59 by a serviceman. A cap 63 is mounted on the back panel to protect the base portion of the picture tube 25.

Under normal conditions of receiver operation, the main chassis 13 and auxiliary chassis 15 are enclosed within cabinet 11 and back panel 59. The conventional customer controls, which are mounted on the main chassis, have control elements positioned exteriorly of the cabinet and usually adjacent either the front or sides of the cabinet to provide convenient means for controlling the picture and sound reproduction by manipulation of the channel selector, volume and brightness controls as deemed desirable by the customer. The numerically larger group of controls, defined as the service controls and most of which are illustrated as those mounted on auxiliary chassis 15, are inaccessible to the customer. A serviceman may make electrical adjustments of some of these controls as, for instance, the screw-head type indicated by screen control shafts 43 with the aid of a properly formed screw driver extended through apertures 61 in back panel 59. When more extensive servicing is required, back panel 59 is removed, and auxiliary chassis 15 is slidably detached from support members 29 after rotation of locking devices 33 from the ends of grooves 31. The auxiliary chassis may then be placed on top of cabinet 11 adjacent the front or viewing panel of the cabinet. From this position the serviceman can directly view the reproduced image while conveniently manipulating the service controls desired.

Although one embodiment of the invention has been shown and described, it will be apparent to those skilled in the art that various changes and modifications may be made therein without departing from the scope of the invention as defined by the appended claims.

What is claimed is:

1. In a television receiver, the combination comprising primary electrical chassis means containing the primary receiver circuits and customer controls, a cabinet for said chassis means having a television viewing portion and a removable cabinet closure member with apertures formed therein, and an auxiliary chassis having service controls electrically coupled to said primary chassis means by lead wires, said cabinet including internal support members formed to provide an internal detachable mounting for said auxiliary chassis during normal operation of said receiver whereby certain ones of said service controls are normally accessible through said closure apertures, the remaining service controls on said auxiliary chassis being normally inaccessible, said lead wires having a length sufficient to allow positioning of said auxiliary chassis for access from said viewing position upon detachment of said auxiliary chassis from said support members and after removal of said closure member to provide accessibility for manipulation of said service controls from the viewing position.

2. In a television receiver, the combination comprising primary electrical chassis means containing the primary receiver circuits, customer controls, and a picture tube, a cabinet for said chassis means having a television viewing portion and a removable cabinet closure member with apertures formed therein, and an auxiliary chassis having service controls electrically coupled to each of said primary chassis means and said picture tube by a plurality of lead wires, said cabinet including internal support members formed to provide an internal detachable mounting for said auxiliary chassis during normal operation of said receiver whereby certain ones of said service controls are normally accessible through said closure apertures, the remaining service controls on said auxiliary chassis being normally inaccessible, said lead wires having a length sufficient to allow positioning of said auxiliary chassis for access from said viewing position upon detachment of said auxiliary chassis from said support members and after removal of said closure member to provide accessibility for manipulation of said service controls from the viewing position.

References Cited in the file of this patent

Rider Television Manual, vol. 2.

RCA TV, pages 2–6, copyrighted 1949 (copy in Scientific Library.)

Radio and TV News, January 1955, pp. 66 and 74 (copy in Scientific Lib.)

Radio's Master, 1954–5 (19th) ed., copyrighted 1954, United Catalog Publishers, Inc., 107–110 Lafayette St., New York 13, N.Y., page U–57 (copy in Division 41.)

Radio and Television News (1), November 1955, pages 46 to 48.

Radio and Television News (2), June 1957, pages 46 to 48 and 141.

Rider Television Manual, vol. 10, Dumont TV, pages 10–14, received in U.S. Patent Office January 6, 1953.